(12) United States Patent
Carroll et al.

(10) Patent No.: US 6,304,575 B1
(45) Date of Patent: Oct. 16, 2001

(54) TOKEN RING SPANNING TREE PROTOCOL

(75) Inventors: David A. Carroll, Apex; Kara J. Adams; Kenneth H. Potter, Jr., both of Raleigh, all of NC (US); Praveen Jain, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/143,994

(22) Filed: Aug. 31, 1998

(51) Int. Cl.$^7$ ............................................. H04L 12/28
(52) U.S. Cl. ................................... 370/408; 370/408
(58) Field of Search ................................. 370/254, 255, 370/256, 257, 258, 400, 401, 402, 403, 404, 408, 428, 429; 709/220, 221, 223, 224, 225, 239, 249, 251, 252

(56) References Cited

U.S. PATENT DOCUMENTS

| | | | |
|---|---|---|---|
| 4,922,486 | 5/1990 | Lidinsky et al. | 370/60 |
| 5,280,480 | 1/1994 | Pitt et al. | 370/85.13 |
| 5,394,402 | 2/1995 | Ross | 370/94.1 |
| 5,430,728 | * 7/1995 | Narayanan et al. | 370/404 |
| 5,734,824 | * 3/1998 | Choi | 709/224 |
| 5,740,171 | 4/1998 | Mazzola et al. | 370/392 |
| 5,742,604 | 4/1998 | Edsall et al. | 370/401 |
| 5,764,636 | 6/1998 | Edsall | 370/401 |
| 5,818,838 | * 10/1998 | Backes et al. | 370/390 |
| 5,841,990 | * 11/1998 | Picazo, Jr. et al. | 709/249 |
| 6,032,194 | * 2/2000 | Gai et al. | 709/239 |
| 6,163,543 | * 12/2000 | Chin et al. | 370/400 |

OTHER PUBLICATIONS

S. Horowitz, *Dancing Bears*, Copyright© 1996.
S. Horowitz, *Dual–Layer Spanning Tree*, May 1997.
R. Perlman, *Interconnections: Bridges and Routers*, Copyright © 1992, pp. 54–64.
IEEE P802.1Q, *Draft Standard for Virtual Bridged Local Area Networks*, May 16, 1997, pp. 1–10 and 20–21.
IEEE P802.1Q *Draft Standard for Virtual Bridged Local Area Networks*, Aug. 30, 1996, pp. 1–7 and 35–39.
IEEE P802.1Q *Draft Standard for Virtual Bridged Local Area Networks*, Jul. 4, 1996, pp. 1, 6–7 and 28–31.

(List continued on next page.)

*Primary Examiner*—Kwang B. You
(74) *Attorney, Agent, or Firm*—Cesari and McKenna, LLP

(57) ABSTRACT

An improved spanning tree protocol for use by token ring intermediate devices having one or more Concentrator Relay Function (CRF) entities and associated Bridge Relay Function (BRF) entities. Each CRF and BRF entity preferably includes a spanning tree engine and corresponding database for individually executing an instance of the spanning tree algorithm and is configured to select a different Bridge Protocol Data Unit (BPDU) message type for use in executing its respective spanning tree algorithm. The selection of BPDU message type by the CRF and BRF spanning tree engines preferably depends on the routing configuration of the associated CRF. The selection of BPDU message type by the CRF entities assures that they are dropped by legacy intermediate devices and only acted upon by the originating CRF or another CRF coupled thereto. The selection of BPDU message type by the BRF entities assures that they are passed through CRF entities unmodified and yet are acted upon by other BRF entities and/or any legacy intermediate devices coupled to the associated BRF entity.

21 Claims, 6 Drawing Sheets

OTHER PUBLICATIONS

*Lucent Technologies Inc.'s Initial Disclosure of Prior Art Under Civil Local Rule 16–7*, Civil Action No. C98–20836JW(PVT)ENE (United States District Court Northern District of California—San Jose Division).

*Interconnecting Catalyst Token Ring Switches Using ISL*, Cisco Systems, Inc., published Mar. 17, 1998.

*Overview of Token Ring Switching*, Cisco Systems, Inc., published Mar. 17, 1998.

*The Catalyst Token Ring Switching Family*, Cisco Systems, Inc., published Mar. 29, 1998.

*Cisco Introduces Family of Second–Generation Token Ring Switches*, Cisco Systems, Inc., Press Release Sep. 10, 1997.

IEEE 802.5 *Draft Supplement to IEEE Standard 802.5 Annex K—(Informative) DTR Concentrator Functional Description*, Jul. 31, 1995.

*Token Ring VLANs and Related Protocols*, Cisco Systems, Inc., published Mar. 17, 1998.

*Understanding Token Ring Switching*, Cisco Systems, Inc., published Mar. 26, 1998.

*Token Ring Inter–Switch Link*, Cisco Systems, Inc., published Jun. 25, 1998.

*IBM Token–Ring Network: Architecture Reference*, (3rd ed. Sep. 1989), pp. iii–vi and 3–5 to 3–10.

IEEE 802.5 *Token Ring Access Method and Physical Layer Specifications*, (3rd ed. May 26, 1998), pp. i–x, 20–29 and 48–49.

* cited by examiner

TOKEN RING SPANNING TREE PROTOCOL

FIELD OF THE INVENTION

The present invention relates generally to computer networks, and more specifically, to an improved method and apparatus for generating loop-free paths in token ring networks.

BACKGROUND OF THE INVENTION

A computer network typically comprises a plurality of interconnected nodes. A node may consist of any device, such as a host, endstation, server, etc., that transmits or receives data frames. A common type of network is a local area network ("LAN") which typically refers to a privately owned network within a single building or campus. LANs typically employ a data communication protocol (LAN standard), such as Token Ring or Ethernet, that defines the functions performed by the data link and physical layers of a communications architecture (i.e., a protocol stack), such as the Transport Control Protocol/Internet Protocol (TCP/IP) Reference Model.

In a token ring network, each node or endstation is connected to a physical ring that carries data frames transmitted by the various stations in a single direction. Each station, moreover, acts like a repeater, transmitting all received data frames to the next station on the ring. The right to transmit data on the ring is controlled by a token, which continuously traverses the ring. A token that permits data transmission is referred to a free token. When a station receives the free token and has data to send, it changes the token's configuration to that of a busy token and attaches the busy token to the data frames being sent. As each data frame returns to the sending station, it is removed from the ring. Upon receipt of the last data frame, the sending station transmits a free token to the next station which may, in turn, transmit its own data frames. To simplify network maintenance and troubleshooting, each station is typically connected to the ring through a central concentrator.

Often, it is desirable to connect multiple token ring LANs together and thereby allow the endstations from one ring to exchange information with endstations on other rings. One or more intermediate devices are often used to interconnect multiple token ring LANs. For example, a bridge may be used to provide a "bridging" function between two or more token ring LANs. Alternatively, a switch may be utilized to provide a "switching" function for transferring information between a plurality of token ring LANs. Typically, the bridge or switch is a computer and includes a plurality of ports that couple the device to the token ring LANs.

Token Ring Routing Methods

There are basically two methods of routing frames across multiple interconnected token ring LANs. The first is referred to as source-route bridging (SRB). With source-route bridging, endstations are responsible for determining the route or path to be following through the network in order to reach a desired endstation. The endstations are also responsible for inserting this route information into a routing information field (RIF) of each source-route data frame being sent. The RIF is an ordered list of ring number/bridge number pairs through which the frame is to pass as it traverses the network. When such a frame is received by an SRB bridge, the contents of the RIF are examined to determine whether its entry port's ring number and its bridge number appear in the RIF field. If so, the SRB bridge forwards the frame to the destination port that is coupled to the ring number paired with its bridge number. However, if this ring number already appears in the RIF (e.g., it is paired with some other bridge number), then the frame is dropped since it presumably traversed that ring prior to reaching this SRB bridge. SRB bridges also drop any frames that do not contain an RIF.

In order to determine a path to a particular receiving station, a sending station transmits an explorer frame, such as an all routes explorer frame. SRB bridges receiving an explorer frame add routing information to the frame and forward it out all ports, other than the port on which it was received. The receiving station will thus receive multiple explorer frames, each carrying different routing information. The receiving station examines all of these explorer frames to identify the best (typically the shortest) path to the sending station. This path information is then returned to the sending station so that it may be used in any subsequent messages. With this routing scheme, SRB bridges need not maintain routing tables. All that is required is that each SRB bridge know its unique bridge identifier and the token ring numbers of each ring to which it is attached.

The other routing method is known as transparent routing. With transparent routing, a sending station does not know the path a frame should follow to reach other stations. Instead, the sending station inserts the receiving station's Media Access Control (MAC) address (known as the destination address) and its own MAC address (known as the source address) into each frame. A transparent bridge that receives the frame examines the destination address to identify the destination port onto which the frame should be forwarded. Transparent bridges typically learn which destination port to use for a given destination address by noting on which source port the latest message originating from that entity was received. This information is then stored by each bridge in a block of memory known as a filtering database. Thereafter, when a message is received on a source port, the bridge looks up the destination address in its filtering database and identifies the appropriate destination port for reaching the respective endstation. If no destination port is identified in the filtering database, the bridge floods the message out all ports, other than the source port.

The Institute of Electrical and Electronics Engineers (IEEE) has promulgated a standard, the 802. 1D standard, which governs the design and operation of bridges. This standard calls for bridges to have the capability to operate in either a source-route or a transparent mode, depending on the type of frame that it receives. That is, if the data frame includes an RIF, then the source-route transparent (SRT) bridge operates in a source-route mode with respect to this frame. If the frame does not include a RIF, the SRT bridge operates in a transparent mode by examining the destination MAC address of the frame and performing a look-up in its filtering database. Although this standard has been widely adopted, many token ring networks, especially those corresponding to the IBM Corporation token ring architecture, still utilize intermediate devices (referred to herein as legacy bridges or legacy devices) that operate only in the SRB mode.

Most computer networks also include redundant communications paths so that a failure of any given link does not isolate any portion of the network. The existence of redundant links, however, often results in the formation of circuitous paths or "loops" within the network which are highly undesirable because messages may traverse the loops indefinitely. The resulting traffic effectively overwhelms the network. For example, SRT bridges, as described above, replicate messages whose destination ports are not known or which contain broadcast or multicast destination addresses, resulting in a proliferation of data frames along any loops. Similar problems may occur with broadcast or multicast messages in networks operating in the SRB mode.

Spanning Tree Algorithm

To avoid the formation of loops, most intermediate devices execute a spanning tree algorithm, which allows them to calculate an active network topology that is loop-free (i.e., a tree) and yet connects every pair of LANs within the network (i.e., the tree is spanning). In general, by executing the spanning tree algorithm, bridges elect a single bridge to be the "root" bridge. Since each bridge has a unique numerical identifier (bridge ID), the root is typically the bridge with the lowest bridge ID. In addition, for each token ring coupled to more than one bridge, only one (the "designated bridge") is elected to forward frames to and from the respective ring toward the root bridge. The designated bridge is typically the one closest to the root. Each bridge also selects one port (the "root port") which gives the lowest cost path to the root. The root ports and designated bridge ports are selected for inclusion in the active topology and are placed in a forwarding state so that data frames may be forwarded to and from these ports and thus onto the corresponding paths or links of the network. Ports not included within the active topology are placed in a blocking state. When a port is in the blocking state, data frames will not be forwarded to or received from the port.

To obtain the information necessary to run the spanning tree algorithm, bridges exchange special messages called bridge protocol data unit (BPDU) frames. Each BPDU message has a plurality of fields, including a root identifier field (containing the identifier of the bridge assumed to be the root), a bridge identifier field (containing the identifier of the bridge sending the BPDU), a root path cost field (representing the cost to reach the assumed root from the port on which the BPDU is sent) and a port identifier field (containing the port number of the port on which the BPDU is sent). Upon receipt of a BPDU message, its contents are examined and compared with similar information (e.g., assumed root and lowest root path cost) stored by the receiving bridge. If the information from the received BPDU is "better" than the stored information, the bridge adopts the better information and uses it in the BPDUs that it sends (adding the cost associated with the receiving port to the root path cost) from its ports, other than the port on which the "better" information was received. Although BPDU messages are never forwarded by bridges, the identifier of the root is eventually propagated to and adopted by all bridges as described above, allowing them to select their root port and designated port(s).

In response to network topology changes (e.g., the addition or removal of intermediate devices or links), the active topology is recalculated. Ports that were in the blocking state may need to transition to the forwarding state and ports in the forwarding state may need to transition to the blocking state. Rather than transition directly from blocking to forwarding, the IEEE standard specifies that ports transition between two intermediate states (listening and learning). The IEEE standard also specifies that data messages are not to be forwarded while a port is in the listening or learning states.

Operation of the spanning tree algorithm is well-known to those skilled in the art and is set forth in the IEEE 802. 1D standard, which further provides that BPDUs are to be sent to a specific bridge multicast destination address. Bridges that comply with the 802.1D standard, moreover, are configured to recognize messages with this particular destination address as BPDU messages. Although many SRB bridges also implement a spanning tree protocol for detecting and blocking loops, as described above, they utilize a different bridge multicast destination address than that specified in the IEEE 802.1D standard. The destination address utilized by these SRB bridges typically corresponds to the address specified by the IBM Corporation for its token ring architecture. These IBM compliant BPDU messages also include a route designator in place of the port identifier field. Accordingly, difficulties have arisen when token ring networks having both SRT and SRB bridges are interconnected.

Dedicated Token Ring Bridges

To extend the capabilities of token ring bridges, the IEEE has promulgated the Dedicated Token Ring (DTR) bridge standard in Annex K to the IEEE 802.5 standard governing token ring LANs. The DTR standard establishes a hierarchical bridging arrangement and allows bridge ports to emulate concentrator ports, thereby eliminating the need to connect bridges to concentrators. Specifically, each bridge defines one or more Bridge Relay Functions (BRFs) and one or more Concentrator Relay Functions (CRFs) each of which performs a different bridging function. For example, each CRF interconnects a plurality of physical token ring segments into one logical token ring that has a single ring number. The CRF forwards data messages from one token ring segment to another. The BRF supports bridging between different CRFs. That is, rather than or in addition to forwarding a data message to another token ring segment, a first CRF may pass the message up to its associated BRF. The BRF, in turn, may forward the data message to a second CRF that is also coupled to the BRF. The second CRF may then forward the data message onto one of its token ring segments for receipt by a particular endstation. Thus, the BRF allows data messages to be transferred between different token ring numbers.

FIG. 1 is a highly schematic diagram of a conventional DTR compliant bridge 100. As shown, the DTR bridge 100 has multiple BRF entities 102–104 and multiple CRF entities 106–114. Each BRF 102–104, moreover, is associated with several CRFs 106–114 and each CRF includes a plurality of concentrator ports 116. For example, BRF 102 (also identified as BRF A) is associated with CRFs 106–108 (also identified as CRFs 1 and 2, respectively). Each CRF 106–114, moreover, is connected to multiple token ring segments 118 through its concentrator ports 116. Nonetheless, all of the token ring segments 118 connected to a single CRF (e.g., CRF 106) have a single token ring number (e.g., Token Ring 1). Each CRF 106–114 also has an internal port 120 for communicating with its associated BRF 102–104.

The DTR standard provides that each CRF is to participate in the spanning tree algorithm. That is, each concentrator port of a given CRF may transition between the blocking and forwarding states, depending on the information contained in BPDU messages received by the CRF. The format of these BPDU messages, moreover, corresponds to the IEEE 802.1D standard as described above. Nonetheless, the DTR standard is silent as to whether the BRFs should participate in the spanning tree algorithm and, if so, how that might be implemented, especially in view of the CRF's participation in the spanning tree algorithm. In addition, depending on the particular network configuration, loops may be present between various DTR bridges at the BRF level that are not blocked by execution of the spanning tree algorithm at the CRF level. Accordingly, a need has arisen for detecting and eliminating loops at both the CRF and BRF levels of a DTR bridge.

Additionally, particular token ring segments of a DTR bridge may be interconnected with other bridges that are not DTR compliant, including legacy SRB bridges. This may result in the occurrence of a loop passing through one of the CRFs of the DTR bridge. If the execution of the conventional spanning tree algorithm results in one of the CRF's concentrator ports being placed in the blocking state, connectivity may be lost between segments of the corresponding logical token ring. That is, with the concentrator port blocked, messages from one token ring segment must pass through the legacy SRB bridge to reach the next ring segment. SRB bridges, however, drop messages (including all routes explorer frames) when the RIF already includes the ring number paired with the identifier of the SRB bridge. This may cause a loss of connectivity between endstations associated with the same token ring number but residing on different token ring segments.

SUMMARY OF THE INVENTION

It is an object of the present invention to provide a method and apparatus for executing a spanning tree algorithm to eliminate loops at both the Concentrator Relay Function level and Bridge Relay Function level of a Dedicated Token Ring intermediate device.

It is a further object of the present invention to provide a method and apparatus for distinguishing between Bridge Protocol Data Unit messages to be acted upon by the Concentrator Relay Function and the Bridge Relay Function entities of a Dedicated Token Ring intermediate device.

It is a further object of the present invention to provide an improved token ring spanning tree protocol that allows Dedicated Token Ring intermediate devices to interoperate with source-route, transparent or source-route transparent bridges.

A still further object of the present invention is to provide an improved token ring spanning tree protocol that prevents a particular Concentrator Relay Function entity from becoming improperly segmented.

Briefly, the invention relates to an improved spanning tree protocol for use by a token ring intermediate device having one or more Concentrator Relay Function (CRF) entities and associated Bridge Relay Function (BRF) entities. The invention includes a method and apparatus for defining separate loop-free paths within a corresponding computer network at both the CRF and BRF levels of the intermediate device, while avoiding improper CRF segmentation. Specifically, each CRF and BRF entity of the intermediate device preferably includes a spanning tree engine and corresponding database for executing at least one instance of the spanning tree algorithm. The CRF and BRF spanning tree engines, moreover, are configured to select different Bridge Protocol Data Unit (BPDU) message types for use in executing their respective instances of the spanning tree algorithm. The selection of BPDU message type by the CRF and BRF spanning tree engines preferably depends on the routing configuration of the associated CRF. That is, the selection of BPDU message type depends on whether the CRF is configured in a source-route bridging or source-route transparent mode. The routing configuration of the CRF refers to how its associated BRF bridges frames to and from the CRF. Furthermore, although they may be received by legacy token ring intermediate devices and/or other CRFs, the selection of CRF-BPDU message type assures that they are dropped by source-route or source-route transparent devices. In particular, the selection of CRF-BPDU message type is such that they are not recognized as BPDU messages by source-route or source-route transparent devices coupled to the CRF. The selection of BRF-BPDU message type, on the other hand, assures that they are passed through CRF entities unmodified and yet are recognized and processed by other BRFs and also by any source-route or source-route transparent intermediate devices coupled to the BRF.

In the preferred embodiment, the selected CRF-BPDUs and BRF-BPDUs each utilize at least a different bridge destination address. Furthermore, the BRF-BPDU message type is preferably selected to conform to the routing mode of its associated CRF, while the selected CRF-BPDU message type differs from its routing mode. For example, if the CRF is configured to operate in a source-route bridging (SRB) mode, then the CRF preferably selects BPDUs whose message type, including destination address, complies with the Institute of Electrical and Electronics Engineers (IEEE) 802.1D standard. These IEEE-type CRF-BPDU messages are transmitted by the CRF from its concentrator ports and, if the CRF receives IEEE-type BPDUs, they are processed by the CRF spanning tree engine in accordance with the spanning tree algorithm. That is, the CRF spanning tree engine processes these BPDUs and modifies the states of its concentrator ports accordingly. The BRF associated with this SRB-configured CRF preferably selects IBM-type BPDU messages, including destination address, which are compliant with legacy SRB bridges. In particular, the BRF spanning tree engine formulates IBM-type BRF-BPDUs and hands them down to its associated CRF(s) for transmission. IBM-type BPDU messages that are received by the SRB-configured CRF(s) are handed up to its associated BRF unmodified and the CRF spanning tree engine makes no port state decisions based on these IBM-type BPDU messages. The BRF spanning tree engine, on the other hand, processes these IBM-type BPDUs and modifies the forwarding states of its bridge ports accordingly.

If the CRF is configured to operate in a source-route transparent (SRT) mode, then the CRF preferably selects a BPDU message type having a novel format and destination address as disclosed herein. In particular, the CRF formulates CRF-BPDU messages carrying a new destination address that is distinguishable from the bridge multicast destination address specified by the IEEE standard and the address utilized by legacy SRB bridges. Additionally, these novel CRF-BPDU messages include a route information field, although no route information is actually entered in this field. These CRF-BPDU messages are then transmitted by the CRF. The CRF is also configured to recognize messages that have this novel destination address as BPDU messages and to process such messages in accordance with its running of the spanning tree algorithm. By virtue of this novel destination address, these CRF-BPDU messages are not recognized as BPDU messages by either legacy SRB or SRT intermediate devices. In addition, although they are recognized by SRT bridges as source-route frames, they are nonetheless dropped since there is no route information in the route information field. The BRF associated with this SRT-configured CRF selects a BPDU message type that corresponds to the IEEE standard, including the IEEE bridge multicast destination address. In particular, the BRF formulates IEEE-type BRF-BPDUs and hands them down to its associated CRF(s) for transmission. IEEE-type BPDU messages that are received by the SRT-configured CRF(s) are passed up to its associated BRF unmodified. The BRF processes these IEEE-type BPDUs and modifies the forwarding states of its bridge ports accordingly.

BRIEF DESCRIPTION OF THE DRAWINGS

The above and further advantages of the invention may be better understood by referring to the following description in conjunction with the accompanying drawings, in which.

DETAILED DESCRIPTION OF THE PREFERRED EMBODIMENT

Figure 1:
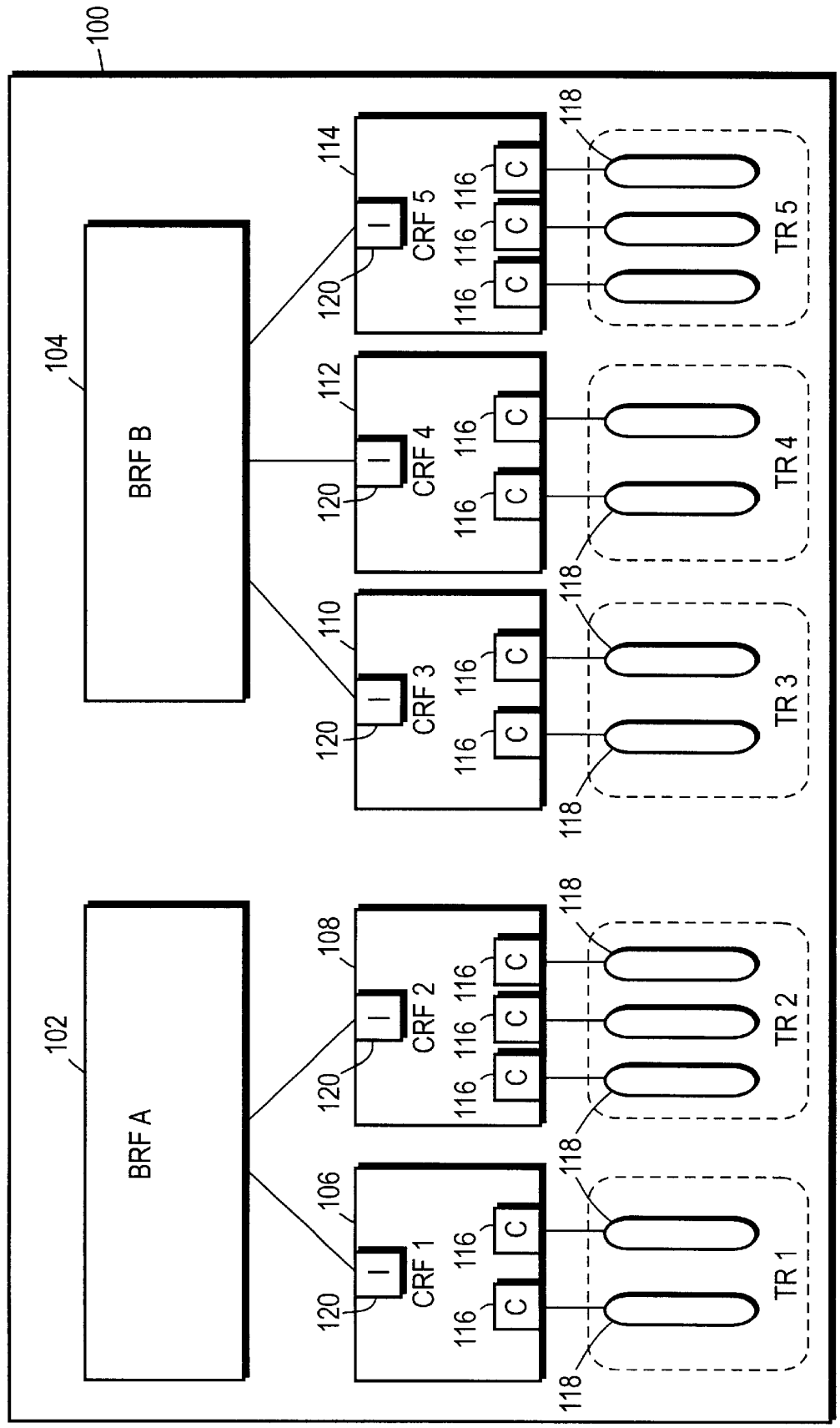
FIG. 1, previously discussed, is a schematic diagram of a Dedicated Token Ring Bridge.
Figure 2:
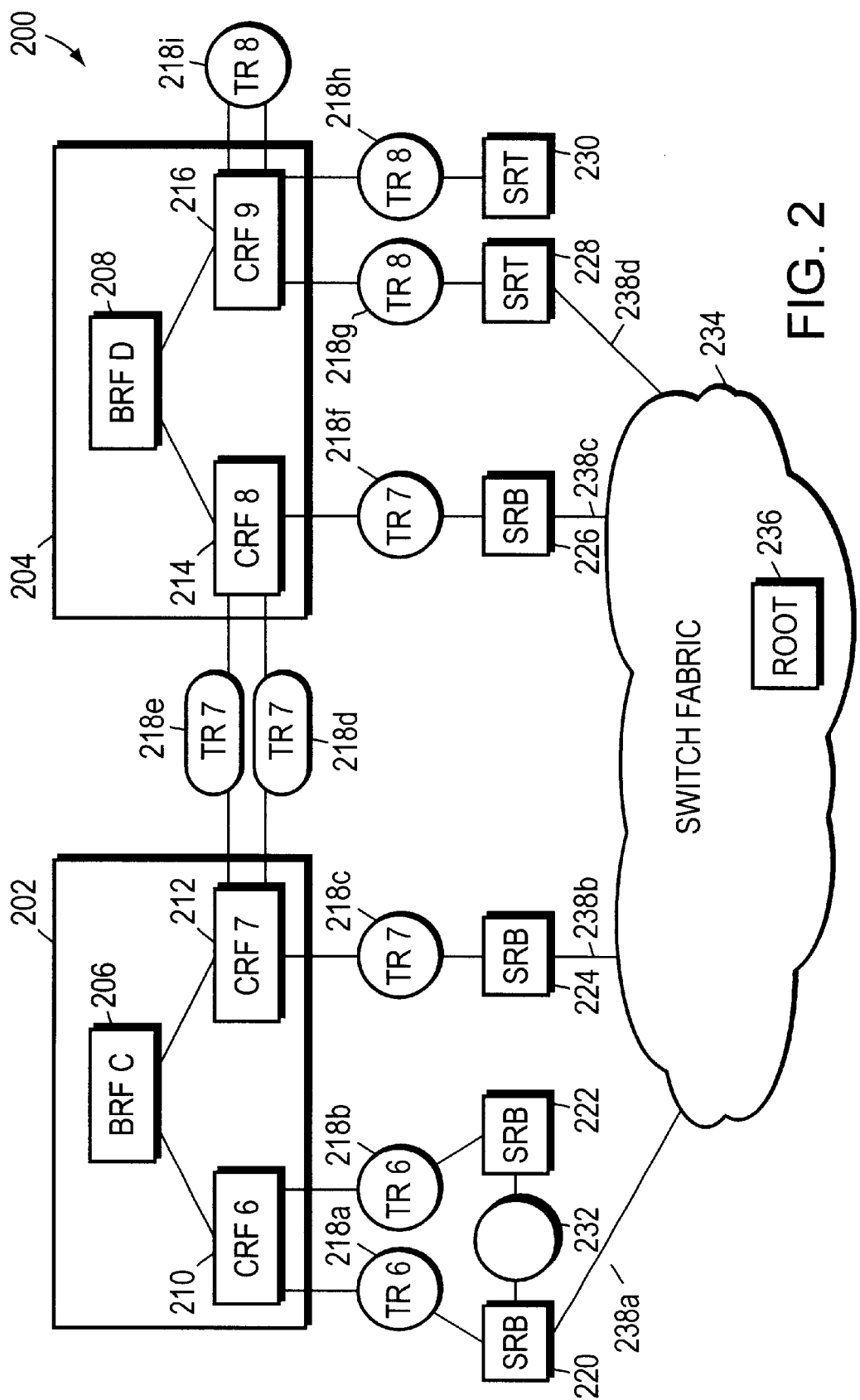
FIG. 2 is a is a schematic diagram of a computer network in accordance with the present invention.

FIG. 2 illustrates a computer network 200 that includes a plurality of local area networks (LANs) interconnected by intermediate devices. In particular, the network 200 includes two Dedicated Token Ring (DTR) intermediate devices or switches 202 and 204 in accordance with the present invention. Each DTR switch 202 and 204 preferably includes one or more Bridge Relay Function (BRF) entities 206 and 208 (also referred to as BRF C and BRF D, respectively). Switches 202 and 204 also include a plurality of Concentrator Relay Function (CRF) entities each of which is associated with one BRF entity. More specifically, switch 202 includes CRF entities 210 and 212 (also referred to as CRF 6 and CRF 7, respectively) that are associated with BRF 206. Switch 204 includes CRF entities 214 and 216 (also referred to as CRF 8 and CRF 9, respectively) that are associated with BRF 208. Each CRF 210–216 preferably includes a plurality of concentrator ports and at least one internal port (not shown).

Coupled to the concentrator ports of the CRF entities 210–216 are a plurality of token ring physical segments 218a–i. Those token ring segments (e.g., segments 218a and 218b) coupled to a single CRF entity (e.g., CRF 6) are logically associated as a single token ring having a single identifying token ring number (e.g., Token Ring 6). Connected to the various token ring segments 218, moreover, are a plurality of nodes, such as endstations, servers, etc. (not shown). As recited in Annex K to the IEEE 802.5 standard, which is hereby incorporated by reference in its entirety, each CRF entity 210–216 includes circuitry for switching messages from one token ring segment to another and/or to its associated BRF and each BRF entity 206 and 208 includes circuitry to switch messages among its associated CRFs.

The DTR switches 202 and 204 of the present invention may be coupled to each other and/or to other prior art or legacy intermediate devices, such as source-route bridging (SRB) bridges or source-route transparent (SRT) bridges. For example, as shown in FIG. 2, token ring segments 218a and 218b of switch 202 are coupled to SRB bridges 220 and 222, respectively, and segment 218c is coupled to SRB bridge 224. Switches 202 and 204 are directly coupled to each other through ring segments 218d and 218e which are associated with CRFs 212 and 214. Similarly, switch 204 is coupled to SRB bridge 226 via ring segment 218f, while segments 218g and 218h are coupled to SRT bridges 228 and 230. The other intermediate devices, moreover, may also be interconnected. For example, SRB bridges 220 and 222 are directly connected by a token ring LAN 232.

In the illustrated embodiment, the intermediate devices 202 and 204 are computers having transmitting and receiving circuitry and components, including network adapter cards having physical ports and memory devices, for exchanging data frames. The terms "intermediate device" or "switch" as used herein are intended broadly to cover any intermediate device that includes functionality for operating at the data link layer (i.e., layer 2) of the corresponding data communication protocol stack. This includes, without limitation, bridges that comply (either fully or only partially) with the IEEE 802.1D standard, routers that are fully or only partially compliant with Request for Comments (RFC) 1812 from the Internet Engineering Task Force (IETF), intermediate devices that provide additional functionality (such as Virtual Local Area Network (VLAN) support, IEEE 802.1Q support and/or IEEE 802.1P support), etc.

It should also be understood that the network configuration of FIG. 2 is for illustrative purposes only and that the present invention will operate with other, possibly far more complex, network topologies.

Network 200 also includes a switch fabric 234 to which switches 202 and 204 may be coupled either directly or indirectly. Switch fabric 234 preferably includes a plurality of additional LANs (not shown) that are interconnected by a plurality of additional intermediate devices (not shown). A root bridge or root device 236 may be disposed within the switch fabric 234. As shown, switches 204 and 206 are connected to the switch fabric 232 through bridges 220, 224, 226 and 228 and each other. In particular, links 238a–d from bridges 220, 224, 226 and 228, respectively, are connected to the switch fabric 232.

As shown, multiple loops or redundant paths exist in computer network 200. For example, a loop exists between CRF 210, SRB bridges 220 and 222, and token ring 232. A loop also exists inside CRFs 212 and 214 through segments 218d and 218e. Another loop exists inside CRF 216 which has two of its concentrator ports coupled to the same ring segment 218i. Another loop exists between BRF 206 and SRB bridges 220 and 224 by virtue of links 238a and 238b and the switch fabric 234. Similarly, a loop exists between BRF 208 and SRB bridge 226 and SRT bridge 228 by virtue of links 238c and 238d and the switch fabric 234. As described above, the existence of these loops poses significant problems within network 200 since messages may traverse the loops indefinitely, thereby overwhelming the network 200.

Figure 3:
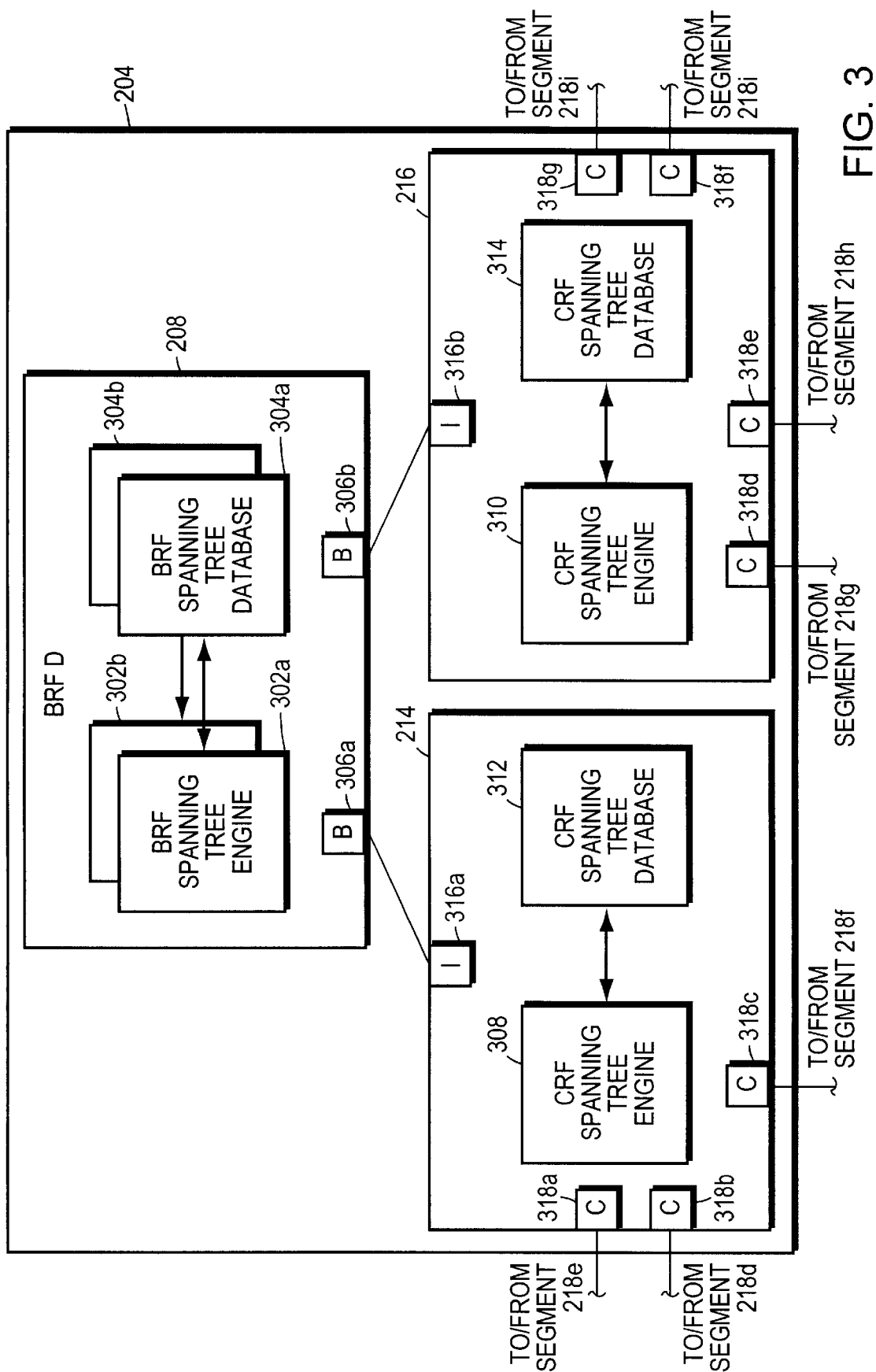
FIG. 3 is a partial block diagram of a token ring intermediate device in accordance with a preferred embodiment of the present invention.

FIG. 3 is a block diagram of switch 204. As described above, switch 204 includes at least one BRF entity 208 that is associated with CRF entities 214 and 216. In accordance with the present invention, BRF entity 208 includes one or more BRF spanning tree engines 302a and 302b each associated with a BRF spanning tree database 304a and 304b. The BRF entity 208 also includes a plurality of bridge ports or interfaces 306a and 306b for connection to its associated CRFs 214, 216. Each CRF entity 214 and 216 of switch 204 also includes at least one CRF spanning tree engine 308 and 310 and an associated CRF spanning tree database 312 and 314, respectively. Each CRF entity 214 and 216 also includes an internal port or interface 316a and 316b, respectively, that is coupled to a respective bridge port 306a and 306b of the associated BRF entity 208. Each CRF 214 and 216 further includes a plurality of concentrator ports 318a–c and 318d–g that are connected to corresponding token ring segments, as described above.

It will be understood to those skilled in the art that the spanning tree engines 302, 308 and 310 may comprise registers and combinational logic configured and arranged to produce sequential logic circuits and that spanning tree databases 304, 312 and 314 may be implemented as content addressable memory (CAM) devices. In the illustrated embodiment, these components preferably comprise programmable processing elements containing software programs pertaining to the methods described herein and executable by the processing elements. Other computer readable media may also be used to store and execute the program instructions.

Execution of the Improved Token Ring Spanning Tree Protocol

Figure 4A:
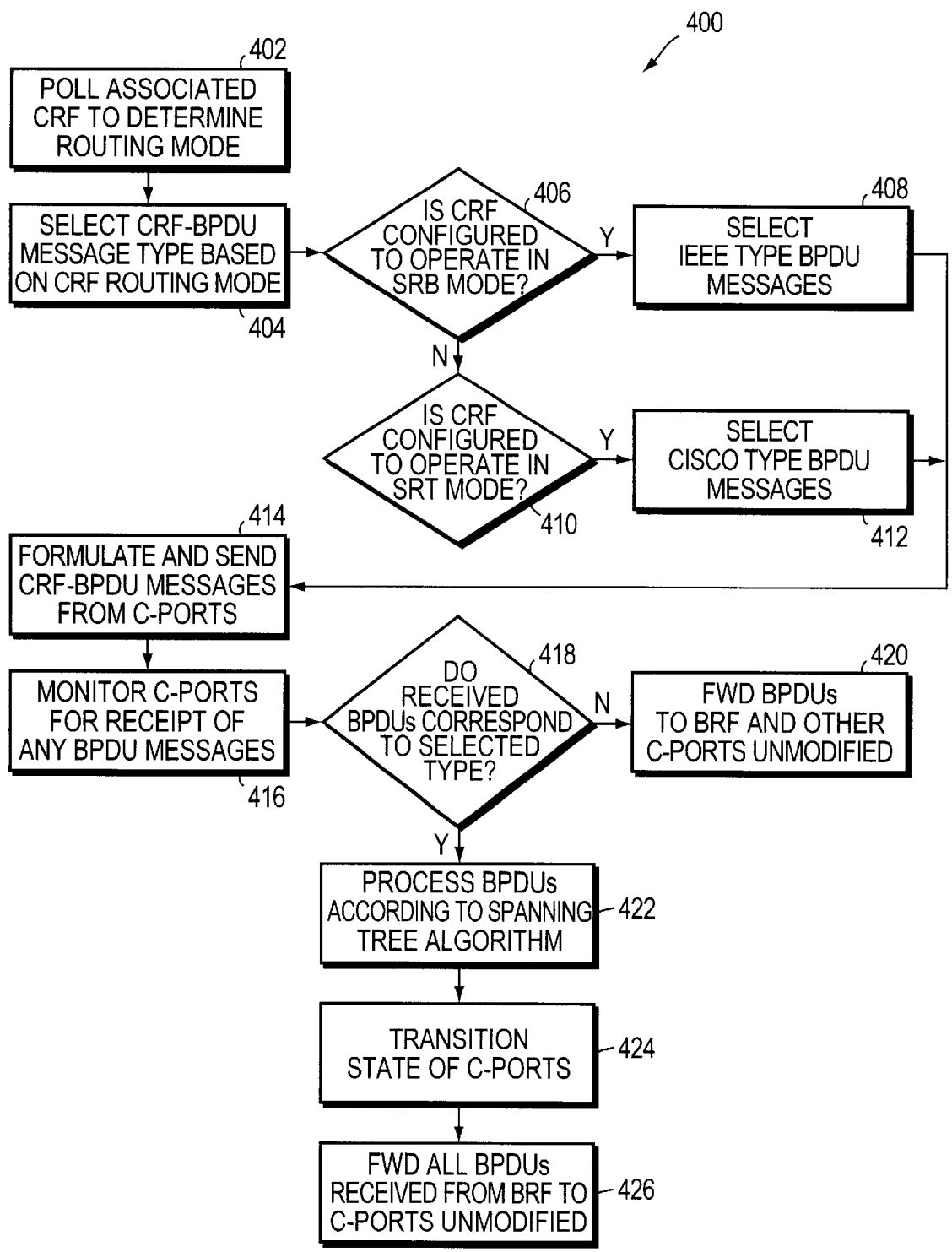
FIGS. 4A–B are flow diagrams of an improved token ring spanning tree protocol method in accordance with the present invention.

In general, the spanning tree engines at the CRF and BRF entities each run at least one separate instance of the spanning tree algorithm and select a different Bridge Protocol Data Unit (BPDU) message type for use in executing their respective instances of the spanning tree algorithm. The selection of BPDU message type by both the CRF and BRF entities depends on the routing mode of the associated CRF. FIG. 4A is a flow diagram of the steps 400 preferably implemented by a CRF spanning tree engine (e.g., CRF spanning tree engine 308) in accordance with the present invention. Upon initialization, the CRF spanning tree engine (CRF-ST engine) 308 polls its associated CRF 214 to determine its routing configuration as indicated by block 402. It should be understood that each CRF entity will be configured in a conventional manner to implement only a single routing mode (e.g., source-route bridging or source-route transparent bridging) at any given time. The configured routing mode, moreover, will typically comply with the other bridges or intermediate devices, if any, coupled to the CRF.

Next, the CRF-ST engine 308 selects a particular BPDU message type for use in running its instance of the spanning tree algorithm, as indicated at block 404. More specifically, as shown at block 406, the CRF-ST engine 308 may query whether the CRF is configured to operate in source-route bridging (SRB) mode. If so, the CRF-ST engine 308 preferably selects BPDUs whose message type, including destination address, complies with the Institute of Electrical and Electronics Engineers (IEEE) 802.1D standard, as indicated at block 408. If the CRF is not operating in SRB mode, the CRF-ST engine 308 may query whether it is operating in the source-route transparent (SRT) mode, as shown at block 410. If so, the CRF-ST engine 308, as indicated at block 412, preferably selects a new BPDU message type (referred to herein as a Cisco-type CRF-BPDU message) having a previously unused destination address as described below. Next, the CRF-ST engine 308 begins to formulate and send BPDU messages corresponding to the selected BPDU message type, as indicated at block 414.

Figure 5A:
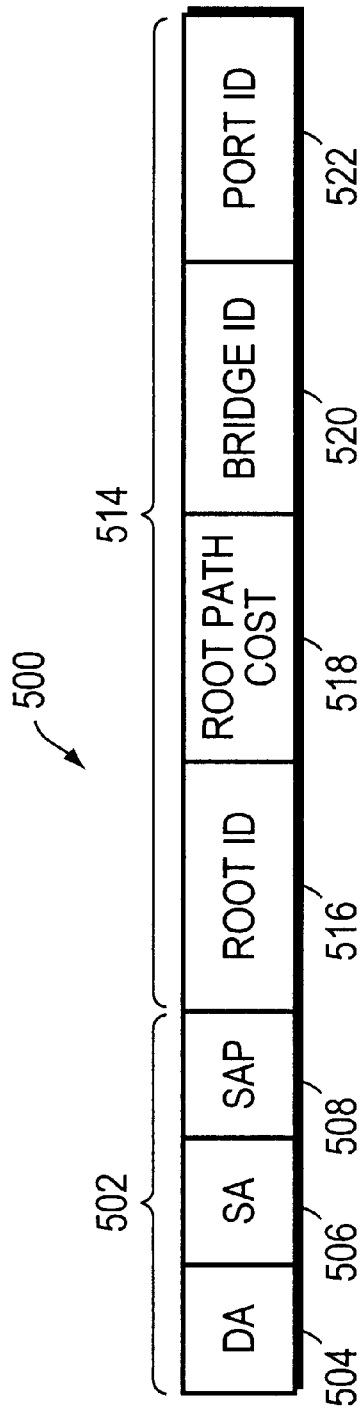
FIGS. 5A–B are block diagrams of preferred Bridge Protocol Data Unit messages in accordance with the present invention.

FIG. 5A is a block diagram of a preferred IEEE-type BPDU message 500 for use with the present invention. The IEEE-type BPDU message 500 includes a message header 502 that is preferably compatible with the Media Access Control (MAC) layer of the respective communications protocol stack. The message header 502 comprises a plurality of fields, including a destination MAC address field 504, a source MAC address field 506, and a Service Access Point (SAP) field 508, among others. The SAP field 508 may be set to 0x424203. Appended to message header 502 is an IEEE-type BPDU message area 514 that also contains a number of fields, including a root identifier (ROOT ID) field 516, a root path cost field 518, a bridge identifier (BRIDGE ID) field 520, and a port identifier (PORT ID) field 522, among others.

Figure 5B:
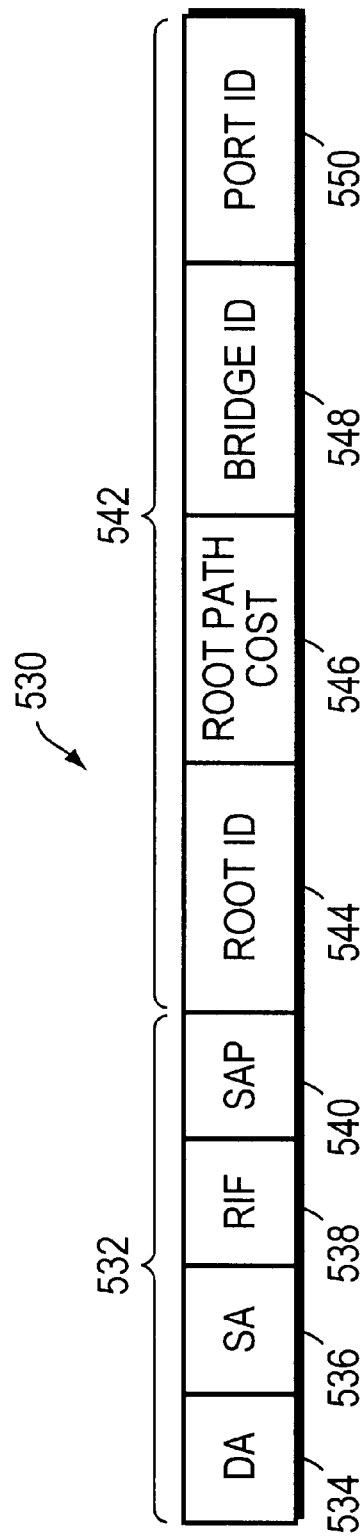

FIG. 5B is a block diagram of a preferred Cisco-type BPDU message 530 in accordance with the present invention. The Cisco-type BPDU message 530 similarly includes a message header 532 that is compatible with the MAC layer of the respective communications protocol stack and comprises a plurality of fields, including a destination MAC address field 534, a source MAC address field 536, a SAP field 538 and an RIF field 540, among others. Appended to message header 532 is a Cisco-type BPDU message area 542 that also contains a number of fields, including a root identifier (ROOT ID) field 544, a root path cost field 546, a bridge identifier (BRIDGE ID) field 548, and a port identifier (PORT ID) field 550, among others.

For IEEE-type CRF-BPDU messages 500, the CRF-ST engine 214 preferably loads the destination address field 504 with the bridge multicast address specified in the IEEE 802.1D standard for BPDU messages (i.e., H'800143000000 in non-canonical format) and the source address field 506 with the MAC address of the device sending the IEEE-type CRF-BPDU. For Cisco-type BPDU messages 530, the destination address field 534 is preferably loaded with a novel multicast destination address (e.g., x'800778020200 in non-canonical format), rather than the conventional bridge multicast address specified by the IEEE standard. In addition, the higher order bit of the source address loaded in field 536 of Cisco-type CRF-BPDU message 530 is preferably asserted to indicate that this message is a source-route frame. The RIF field 540 is preferably 2 octets in length, but is not loaded with any route descriptors. Instead, RIF 540 only contains two byte routing control information (e.g., H'0200).

Although the BPDU message areas 514, 542 each preferably include additional fields, such as a protocol identifier field, a version field, a message type field, a flags field, a message age field, a maximum age field, a hello time field and a forward delay time field, these fields have been omitted from FIGS. 5A and 5B for clarity. The BPDU message headers 502 and 532 may each similarly include additional fields. For example, the BPDU message headers 502, 532 may contain information that supports transmission of the BPDU over links configured to carry Virtual Local Area Network (VLAN) tagged messages, such as a VLAN identifier field. These links may be compatible with the draft IEEE 802.1Q standard. BPDU messages 500, 530 may also be encapsulated, pursuant to various encapsulation techniques, such as the Inter-Switch Link from Cisco Technology, Inc., for transmission over high-speed links.

Whether the IEEE-type BPDU 500 or Cisco-type BPDU 530 has been selected, the CRF-ST engine 308 preferably loads the fields of the respective BPDU message area 514, 542 with information from its associated CRF-ST database 312 in accordance with the conventional spanning tree protocol. That is, the CRF-ST engine 308 loads the Root ID field 516 or 544 with the bridge identifier for the assumed root and the Bridge ID field 520 or 548 with the numeric bridge identifier corresponding to switch 204. Depending on the particular concentrator port 318a–c on which the CRF-BPDU message 500 or 530 is to be sent, the CRF-ST engine 308 also loads the root path cost field 518 or 546 and the Port ID field 522 or 550 with the corresponding information for that port in accordance with the conventional spanning tree protocol.

It should be understood that other novel destination addresses (including unicast, multicast or broadcast addresses) may be utilized in the destination address field of Cisco-type BPDU messages, provided that other CRFs operating in accordance with this invention are configured to associate the chosen address with Cisco-type CRF-BPDU messages. It should be further understood that the order of fields, including RIF 538, within BPDU message 530 may be changed.

The CRF-ST engine 308 also monitors the concentrator ports (e.g., ports 318a–c) of its corresponding CRF for the receipt of any BPDU messages, as shown at block 416. Received BPDU messages are examined by the CRF-ST engine 308 to determine whether they correspond to the selected BPDU message type, as shown at block 418. If they do correspond to the selected BPDU message type, then the CRF-ST engine 308 processes the BPDU messages in accordance with the spanning tree protocol regardless of the state of the receiving port, as shown at block 422. More specifically, as reflected by block 424, the CRF-ST engine 308 transitions the states of the concentrator ports based on the information contained in the CRF-BPDU messages that are sent and received by the CRF-ST engine 308. Preferably, the CRF-ST engine 308 implements the spanning tree protocol as described in the IEEE 802.1D standard, except as indicated herein.

On the other hand, if the received BPDU messages do not correspond to the selected BPDU message type and the receiving port is in the forwarding state, the CRF-ST engine 308 preferably passes the non-conforming BPDU messages up to its associated BRF entity (e.g., BRF 208) and also forwards them out its other concentrator ports that are in the forwarding state, as indicated by block 420. The contents of these non-conforming BPDU messages are not modified by the CRF-ST engine 308.

To the extent BPDU messages are passed down to the CRF from its associated BRF, these BRF originating BPDU messages are forwarded on all of the concentrator ports of the CRF that are in the forwarding state, as shown by block 426. The BRF originating BPDU messages are also left unmodified by the CRF-ST engine.

Figure 4B:
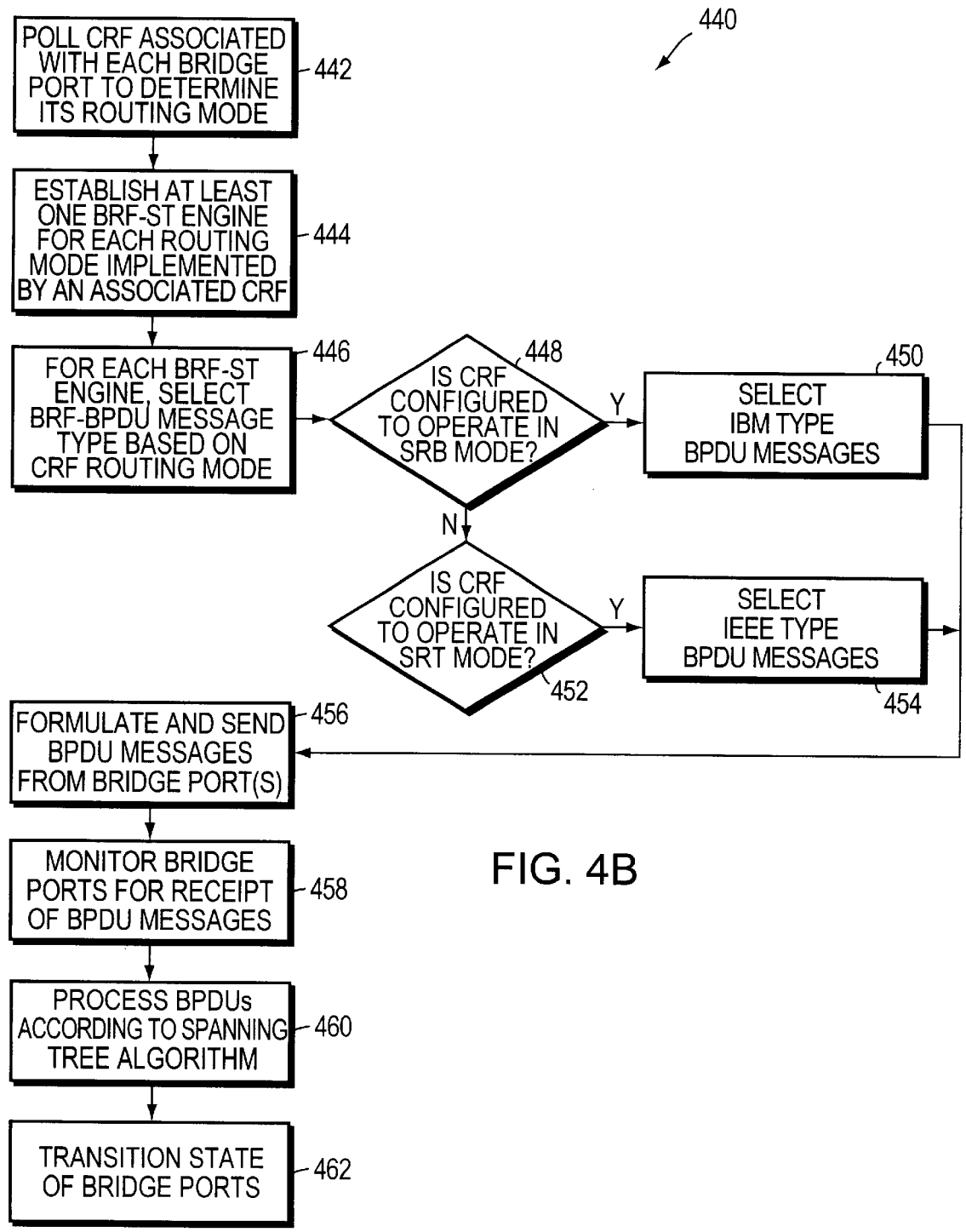

FIG. 4B is a flow diagram of the steps 440 preferably implemented by each BRF spanning tree engine in accordance with the present invention. In particular, the BRF-ST engine first polls each of its associated CRFs to determine the routing mode being implemented by the respective CRF, as indicated by block 442. For each routing mode being implemented by a CRF (e.g., source-route bridging or source-route transparent) a separate BRF-ST engine may be established, as indicated by block 444. For example, if a given BRF is connected to a first CRF configured to operate in the SRB routing mode and also to a second CRF configured to operate in SRT routing mode, then two BRF-ST engines may be established, one associated with the SRT-configured CRF and the other associated with the SRB-configured CRF.

For each BRF-ST engine so established, a BRF-BPDU message type is then selected based on the routing mode implemented by the associated CRF, as indicated by block 446. More specifically, as shown at block 448, the BRF-ST engine 302 may query whether each CRF is configured to operate in source-route bridging (SRB) mode. If so, the BRF-ST engine 302 preferably selects BPDUs whose message type, including bridge multicast destination address, complies with BPDUs exchanged by legacy SRB bridges (i.e., BPDUs specified by the IBM Corporation token ring architecture), as indicated at block 450. If a CRF is not operating in SRB mode, the BRF-ST engine 302 may query whether it is operating in the source-route transparent (SRT) mode, as shown at block 452. If so, the BRF-ST engine 302, as indicated at block 454, preferably selects BPDUs whose message type, including bridge multicast destination address, complies with the IEEE 802.1D standard. For BRF bridge ports or interfaces that are coupled to trunk or high-speed links, the BRF-ST engine preferably selects IEEE-type BRF-BPDU messages for transmission.

The IEEE-type BRF-BPDU message preferably corresponds to the format of BPDU message 500 shown in FIG. 5A and described above. For example, if the BRF-ST engine 302 has selected IEEE-type messages, it preferably loads the destination address field 504 of the BRF-BPDU message with the bridge address specified in the IEEE 802.1D standard identified above. The overall format of the IBM-type BRF-BPDU message also corresponds generally to the BPDU message 500 shown in FIG. 5A. However, with IBM-type BRF-BPDU messages, the BRF-ST engine 302 loads the destination address with the bridge multicast address specified in the IBM Corporation token ring architecture (i.e., x'C00000000100 in non-canonical format). Additionally, the port identifier field 522, rather than containing the numeric port identifier (as with the IEEE-type and Cisco-type BPDU messages), contains the token ring number and bridge number pair through which the IBM-type BPDU message is being sent. That is, port identifier field 522 is loaded with a route designator.

Once the appropriate BRF-BPDU message type has been selected, the BRF-ST engines 302a, 302b begin formulating and sending BRF-BPDU messages having the selected type from the bridge ports, as indicated at block 456. In particular, IBM-type BRF-BPDU messages are handed down via bridge port 306a to CRF 214, while IEEE-type BRF-BPDU messages are handed down via bridge port 306b to CRF 216. The BRF-ST engines 302 also monitor their corresponding bridge port(s) for the receipt of BRF-BPDU messages, as shown at block 458. Received BRF-BPDU messages from all CRFs 214, 216 are examined and processed together in a conventional manner by the BRF-ST engines 302a, 302b, which are in cooperating relationship with each other, in accordance with the conventional spanning tree protocol, as shown at block 460. More specifically, as indicated at block 462, the BRF-ST engines 302a, 302b transition the state(s) of its bridge port(s) based on the information contained in all of the BRF-BPDU messages both sent and received.

It should be understood that rather than running a separate BRF-ST engine for each differently configured CRF, a single BRF-ST engine may be run at a BRF even though it may be associated with CRFs configured to operate in both the source-route and source-route transparent modes. In this case, the BRF-ST preferably maps a selected BRF-BPDU message type for transmission on each of its internal ports as a function of the operating mode (e.g., source-route or source-route transparent) of the respective CRF that is coupled thereto.

Alternatively, a BRF may be pre-configured by a system operator to be either an IBM-type or an IEEE-type BRF. If the BRF is configured as an IBM-type, then the BRF preferably runs the IBM-type spanning tree on all bridge ports that are coupled to SRB-configured CRFs and on all trunk ports. Bridge ports coupled to SRT-configured CRFs are blocked. For IBM-type BRF-BPDUs sent on trunk ports, moreover, the route descriptor (which is loaded in the PORT ID field) has the ring number set to the port number and the bridge number set to 0. If the BRF is configured as an IEEE-type, then it runs the IEEE-type spanning tree on bridge ports coupled to SRT-configured CRFs and on trunk ports. Bridge ports coupled to SRB-configured CRFs are blocked.

Since BRF-BPDU messages are only forwarded on CRF concentrator ports that are in the forwarding state, the instance(s) of the spanning tree protocol running at the CRF level should converge before the instance(s) of the spanning tree protocol running at the BRF level. This may be accomplished by reducing one or more timers associated with the spanning tree protocol running at the CRF level. For example, the hello, max-age and/or forward delay times, which are settable parameters within the BPDU messages, may be reduced by an order of magnitude relative to the corresponding values utilized by the spanning tree protocol running at the BRF level.

Operation of the present invention in network 200 by improved DTR switches 202 and 204 proceeds as follows. Assume token ring segments 218d, 218e and 218f are each operating in the source-route bridging mode and, therefore, to bridge these segments to each other and to the switch fabric 234, an SRB bridge (e.g., SRB bridge 226) is utilized. Since these token ring segments are also interconnected via CRFs 212 and 214, these CRFs are also configured to operate in the source-route bridging mode. Following the steps 400 described above, CRF-ST engine 308 at switch 204 will determine that its corresponding CRF 214 is operating in the source-route bridging mode and, therefore, select IEEE-type CRF-BPDU message for execution of its instance of the spanning tree algorithm. Next, CRF-ST engine 308 formulates IEEE-type CRF-BPDU messages for transmission on its concentrator ports 318a–c. To generate these CRF-BPDU messages, CRF-ST engine 302 utilizes the information initially stored in its associated CRF-ST database 312. That is, the CRF-ST database 312 is preferably pre-configured in a conventional manner with such information as the numeric identifier of switch 204 (which the CRF may adopt as its identifier), the numeric identifier of the CRF assumed to be the root (which may, at least initially, be set to the CRF's own numeric identifier), the path costs associated with each of the CRF's concentrator ports, the concentrator port identifier numbers, and the frequency with which BPDU messages are to be sent (i.e., the hello time), among other information.

An IEEE-type CRF-BPDU is then forwarded on each concentrator port 318a–c every hello time and traverses the respective token ring segments 218d–f. The IEEE-type CRF-BPDUs forwarded on segment 218f are received at and examined by legacy SRB bridge 226. SRB bridge 226, however, does not recognize messages with the IEEE bridge multicast address as BPDU messages and is also configured to drop any messages that do not contain a RIF. Since the IEEE-type CRF-BPDU messages from CRF 214 do not contain an RIF, as described above, they are dropped by SRB bridge 226. That is, SRB bridge 226 neither processes the contents of these messages nor forwards them on its other ports, such as the port coupled to link 238c.

IEEE-type CRF-BPDU messages from CRF 214 are also received at CRF 212 of improved DTR switch 202 via ring segments 218d and 218e. CRF 212, however, is also configured in source-route bridging mode and, in accordance with the present invention, has also selected IEEE-type BPDU messages for execution of its instance of the spanning tree algorithm. As a result, CRF 212 "knows" to process the contents of the IEEE-type CRF-BPDU messages from CRF 214 as part of its instance of the spanning tree protocol, even though CRF 212 is operating in the source-route bridging mode and these CRF-BPDU messages carry the IEEE bridge multicast address and not the IBM bridge multicast address.

In particular, CRF 212 examines the contents of these IEEE-type CRF-BPDU messages from CRF 214 to see if they contain "better" spanning tree information than that stored by CRF 212 in its associated CRF-ST database (not shown). CRF 212 will then adopt the best information of which it is aware and utilize this information in IEEE-type CRF-BPDU messages that it forwards to CRF 214 via ring segments 218d and 218e. By participating in the same instance of the spanning tree protocol (i.e., by processing the same BPDU message types and thereby basing their running of the spanning tree protocol on the same information), the CRF-ST engines at CRFs 212 and 214 will detect the loop caused by the existence of the two ring segments 218d and 218e. Furthermore, depending on the particular value of their respective bridge identifiers, the two CRFs will elect only one of them to be the root (e.g., CRF 214) for this instance of the spanning tree algorithm.

If CRF 214 is elected the root, then its two concentrator ports 318a and 318b will transition to the forwarding state. In addition, one of the concentrator ports of CRF 212 coupled to ring segments 218d or 218e will transition to the forwarding state as its root port, while the other remains in the blocking state. As a result, the loop presented by these two ring segments will be blocked. Since concentrator port 318c of CRF 214 is not connected to the CRF of another DTR switch operating in accordance with the present invention, it will not receive IEEE-type CRF-BPDU messages. Accordingly, the CRF-ST engine 308 again assumes that it is the root and similarly transitions concentrator port 318c to the forwarding state. Concentrator ports that remain in the blocking state do not forward any frames either to or from the CRF, including source-route explorer frames, single-route explorer frames, BRF-BPDU messages, etc. The only frames forwarded to or from a blocked concentrator port operating in accordance with the present invention are CRF-BPDU messages.

Since ring segments 218c–f are operating in the source-route bridging mode, the existence of the "loop" between CRFs 212 and 214 and the switch fabric 234 via legacy SRB bridges 224 and 226 does not present a problem of replicated, looping frames. More specifically, an all routes explorer frame from an endstation on ring segment 218d will be received at one concentrator port of CRF 214 and forwarded to the switch fabric 234 via ring segment 218f and legacy SRB bridge 226. When the explorer frame exits the switch fabric 234 at legacy SRB bridge 224, it will be dropped since the RIF field of the explorer frame will already indicate that the frame traversed token ring number 7 (which also corresponds to ring segment 218c) as entered in the RIF by CRF 214. Similarly, assuming that the concentrator port at CRF 212 connected to ring segment 218d is in the forwarding state, this all routes explorer frame will also be forwarded to the switch fabric 234 via ring segment 218c and legacy SRB bridge 224. However, when the frame exits the switch fabric 234 at legacy SRB bridge 226, it will similarly be dropped since the RIF field already reflects that the frame has traversed token ring number 7 as entered by CRF 212.

Considering CRF 216 at DTR switch 204, assume that ring segments 218g, 218h and 218i are each operating in the transparent mode. CRF-ST engine 310 will select the Cisco-type CRF-BPDU messages 530 for transmission on its concentrator ports 318d–g and for executing its instance of the spanning tree algorithm as described above. These Cisco-type CRF-BPDU messages 530 are received at SRT bridges 228 and 230 via ring segments 218g and 218h. SRT bridges 228, 230, however, do not recognize messages with this destination address in field 534 as BPDU messages. Instead, SRT bridges 228, 230, upon examining the contents of the source address field 536 (in which the most significant bit has been asserted as described above), assume that these Cisco-type CRF-BPDU messages are source-route frames. As a result, SRT bridges 228, 230 examine the RIF 538 to determine how these Cisco-type CRF-BPDU messages 530 should be forwarded. As also described above, however, the RIF 538 of Cisco-type CRF-BPDU messages 530 does not contain any routing information. Accordingly, SRT bridges 228, 230 simply drop these frames.

Additionally, these Cisco-type CRF-BPDU messages are returned to CRF-ST engine 310 by concentrator ports 318*f* and 318*g* which are both connected to ring segment 218*i*. CRF-ST engine 310 is therefore able to detect the loop caused by connecting both concentrator ports 318*f* and 318*g* to the same ring segment 218*i*. CRF-ST 310 will then block the loop by transitioning only one of the concentrator ports (the designated port) to a forwarding state, while leaving the other concentrator port in the blocking state.

The present invention also operates to detect and block loops that may exist at the BRF or bridge level of the network. Referring to CRF 210 at switch 202, for to example, IBM-type BPDU messages originating from legacy SRB bridge 220 and received at CRF 210 via ring segment 218*a* will be forwarded unmodified associated to ring segment 218*b* for receipt by legacy SRB bridge 222, assuming both of the respective concentrator ports are in the forwarding state. Accordingly, the loop caused by these two ring segments 218*a–b* and token ring 232 will be detected and blocked by SRB bridges 220 and 222 in a conventional manner. That is, from the point of view of SRB bridges 220 and 222, they are both connected to the same token ring (ring number 6). The fact that token ring number 6 is actually broken up into two physical ring segments by CRF 210 is not apparent to SRB bridges 220 and 222. Furthermore, by configuring CRF 210 to run a separate instance of the spanning tree algorithm from SRB bridges 220, 222, improper CRF segmentation is avoided.

In addition, BRF 206 is coupled by a first bridge port to CRF 210 and by a second bridge port to CRF 212 which are both operating in source-route bridging mode. Accordingly, the BRF-ST engine at BRF 206 selects the IBM-type BPDU messages for execution of its instance of the spanning tree algorithm associated with each of these CRFs. IBM-type BRF-BPDU messages are formulated by the BRF-ST engine and handed down to its associated CRFs 210, 212 via its bridge ports. As described above, each CRF 210, 212 forwards these IBM-type BRF-BPDUs only on those concentrator ports that are in the forwarding state. The CRFs 210, 212 do not modify the contents of these BRF-BPDUs. Assuming the respective concentrator ports are in the forwarding state, the IBM-type BRF-BPDUs are received at legacy SRB bridge 220 via ring segment 218*a*, SRB bridge 222 via ring segment 218*b*, SRB bridge 224 via ring segment and CRF 214 via ring segments 218*d* and 218*e*.

Since legacy SRB bridges 220–224 operate in the source-route bridging mode, they recognize these IBM-type BRF-BPDUs. Accordingly, SRB bridges 220–224 process the contents of these received IBM-type BRF-BPDUs in a conventional manner and send BPDUs that also correspond to the IBM token ring architecture to switch 202. If they are received on concentrator ports that are in the forwarding state, these BPDUs from SRB bridges 220–224 are handed up to BRF 203 by the CRFs 210, 212 unmodified. SRB bridges 220 and 224 also send BPDUs into and may receive BPDUs from switch fabric 234. Assuming that the root device 236 for this running of the spanning tree algorithm is located in the switch fabric 234, and that legacy SRB bridges 220–224 will be elected the designated bridges for token ring numbers 6 and 7, BRF 206 will only transition one of its bridge ports (the root port) to the forwarding state, leaving the other bridge port in the blocking state.

IBM-type BRF-BPDU messages from BRF 206 may also be received at CRF 214 via ring segments 218*d* or 218*e*, whichever corresponding concentrator port is in the forwarding state. As described above, CRF 214 elected the IEEE-type BPDU messages for execution of its spanning tree algorithm and thus CRF 214 does not process these IBM-type BRF-BPDU messages. Nonetheless, as described above in accordance with steps 440 of the present invention, CRF 214 forwards these IBM-type BRF-BPDU messages on its concentrator ports that are in the forwarding state (other than the port on which the BRF-BPDU message was received) and also hands them up to BRF 208. Thus, IBM-type BRF-BPDU messages from BRF 206 may reach legacy SRB 226 via CRF 214 and ring segment 218*f* as well as BRF 208. SRB bridge 226 examines these BRF-BPDUs and, since it operates in source-route bridging mode, it processes these BRF-BPDU messages in accordance with its running of the spanning tree algorithm and sends its own BPDU messages that are also compliant with the IBM token ring architecture onto ring segment 218*f*. These IBM compliant BPDU messages from legacy SRB bridge 226 are forwarded to BRF 208 and also to CRF 214 concentrator ports that are in the forwarding state. Thus, IBM compliant BPDU messages from legacy SRB bridge 226 may also reach BRF 206. Similarly, IBM-type BRF-BPDU messages from BRF 208 also reach BRF 206 and possibly SRB bridge 226 via CRFs 212, 214. In this manner, any loops present in this set of interconnected source-route configured bridges of network 200 are detected and blocked.

The foregoing description has been directed to specific embodiments of this invention. It will be apparent, however, that other variations and modifications may be made to the described embodiments, with the attainment of some or all of their advantages. For example, new BPDU message types may be defined for execution at the CRF and/or the BRF level. Therefore, it is the object of the appended claims to cover all such variations and modifications as come within the true spirit and scope of the invention.

What is claimed is:

1. An intermediate device for use in a computer network, the intermediate device comprising:

at least one bridge relay function (BRF) entity;

at least one concentrator relay function (CRF) entity associated with each of the at least one BRF entity, the at least one CRF entity configured to operate in one of source-route bridging (SRB) and source route transparent (SRT) modes;

a spanning tree engine at the at least one CRF entity configured to execute a first instance of the spanning tree algorithm;

means for selecting a first bridge protocol data unit (BPDU) message type for use in executing the first instance of a spanning tree algorithm at the at least one CRF entity, selection of the first BPDU message type being responsive to the routing mode of the first CRF entity;

at least one spanning tree engine at the at least one BRF entity, the at least one BRF spanning tree engine configured to execute a second instance of the spanning tree algorithm; and means for selecting a second BPDU message type for use in executing the second instance of the spanning tree algorithm at the at least one BRF entity, selection of the second BPDU message type being responsive to the routing mode of the at least one CRF entity associated with the at least BRF entity.

2. The intermediate device of claim 1 wherein the second BPDU message type conforms to the routing mode of the associated CRF entity and the first BPDU message type differs from the routing mode.

3. The intermediate device of claim 1 wherein
the at least one BRF entity includes one or more bridge ports for communicating with its associated CRF entities, and
the BRF spanning tree engine transitions each bridge port among a plurality of spanning tree port states including at least a blocking state and a forwarding state in response to executing the second instance of the spanning tree algorithm.

4. The intermediate device of claim 3 wherein
the at least one CRF entity has a plurality of concentrator ports, and
the CRF spanning tree engine transitions each concentrator port among a plurality of spanning tree port states including at least the blocking and the forwarding states in response to executing the second instance of the spanning tree algorithm.

5. The intermediate network device of claim 4 wherein BPDU messages received at the concentrator ports of the at least one CRF entity that correspond to the first BPDU message type are processed by the CRF spanning tree engine while BPDU messages received at the concentrator ports of the least one CRF entity that do not correspond to the first BPDU message type are passed to the associated BRF entity for processing by the BRF spanning tree engine.

6. The intermediate device of claim 5 wherein the BPDU messages passed to the BRF entity remain unmodified by the CRF entity.

7. The intermediate device of claim 4 wherein
the BRF spanning tree engine generates BPDU messages corresponding to the second message type,
BRF generated BPDU messages are passed to each CRF entity associated with the BRF entity, and
BRF generated BPDU messages received at a CRF entity are forwarded from all concentrator ports that are in the forwarding port state.

8. The intermediate device of claim 1 further comprising at least two CRF entities associated with the same BRF entity, wherein
a first of the at least two CRF entities is configured to operate in SRB mode,
a second of the at least two CRF entities is configured to operate in SRT mode, and
the at least one BRF spanning tree engine executes at least two instances of the spanning tree algorithm whereby a first instance is associated with the first CRF entity and the second instance is associated with the second CRF entity.

9. The intermediate device of claim 8 wherein
the CRF spanning tree engine at the first CRF entity generates BPDU messages whose type complies approximately with Institute of Electrical and Electronics Engineers (IEEE) 802.1D specification standard, and
the CRF spanning tree engine at the second CRF entity generates BPDU messages having a destination address that differs from the destination address specified by the IEEE 802.1D specification standard.

10. The intermediate device of claim 9 wherein the BPDU messages generated at the second CRF entity include a route information field (RIF).

11. The intermediate device of claim 10 wherein the RIF is devoid of any route descriptors.

12. The intermediate device of claim 10 wherein the BPDU messages generated at the second CRF entity include a source address and the source address is set so as to indicated that the BPDU messages are source-route messages.

13. The intermediate device of claim 8 wherein
the first instance of the spanning tree algorithm executing at the BRF entity generates BPDU messages having at least one token ring number and bridge number pair, and
the second instance of the spanning tree algorithm executing at the BRF entity generates BPDU messages whose type approximately complies with Institute of Electrical and Electronics Engineers (IEEE) 802.1D specification standard.

14. A network device for use in a computer network, the network device comprising sing:
at least one bridge relay function (BRF) entity;
at least one concentrator relay function (CRF) entity associated with each of the at least one BRF entity, the at least one CRF entity configured to operate in one of source-route bridging (SRB) and source route transparent (SRT) modes;
a spanning tree engine at the at least one CRF entity configured to execute a first instance of a spanning tree protocol (STP);
a spanning tree engine at the at least one BRF entity configured to execute a second instance of the STP; and
at least one selector cooperating with the CRF spanning tree engine and with the BRF spanning engine in order to select a first bridge protocol data unit (BPDU) message type for use in executing the STP instance at the at least one CRF entity and a second BPDU message type for use in executing the STP instance at the at least one BRF entity, wherein
selection of the first BPDU message type depends on the routing mode of the first CRF entity.

15. The network device of claim 14 wherein selection of the second BPDU message type depends on the routing mode of the at least one CRF entity associated with the at least BRF entity.

16. The network device of claim 14 wherein the first BPDU message type differs from the second BPDU message type.

17. The network device of claim 14 wherein the first and second BPDU message types each have a destination address field, and the address loaded into the respective destination address fields of the first and second BPDU message types differ from each other.

18. A method for use by a network device in detecting and eliminating loops in a computer network, the network device having at least one bridge relay function (BRF) entity, at least one concentrator relay function (CRF) entity associated with the at least one BRF entity, a plurality of concentrator ports at the at least one CRF entity for use in communicating with the computer network, and one or more bridge ports at the at least one BRF entity for communicating with the CRF entity, the at least one CRF entity configured to operate in one of source-route bridging (SRB) and source route transparent (SRT) modes, the method comprising the steps of:
running a first instance of a spanning tree protocol (STP) at the at least one CRF entity so as to transition the concentrator ports among a plurality of spanning tree port states including at least a forwarding state and a blocking state;

running a second instance of the STP at the least one BRF entity so as to transition the bridge ports among a plurality of spanning tree port states including at least the forwarding and blocking states;

if the at least one CRF entity is configured to operate in SRB mode, generating by the first STP instance BPDU messages whose type approximately complies with the Institute of Electrical and Electronics Engineers (IEEE) 802.1D specification standard; and if the at least one CRF entity is configured to operate in SRT mode, generating by the first STP instance BPDU messages having a destination address that differs from the destination address specified by the IEEE 802.1D specification standard.

19. The method of claim 18 wherein the BPDU messages generated at the CRF entity operating in SRT mode include a route information field (RIF) that is devoid of any route descriptors.

20. The method of claim 18 further comprising the step of running a separate instance of the STP at the at least one BRF entity for each CRF entity associated with the at least one BRF entity that is operating in a different bridging mode.

21. The method of claim 18 further comprising the steps of:

if the at least one CRF entity associated with a given BRF entity is configured to operate in SRB mode, generating by the second STP instance executing at the BRF entity BPDU messages having at least one token ring number and bridge number pair; and if the at least one CRF entity associated with the given BRF entity is configured to operate in SRT mode, generating by the second STP instance executing at the BRF entity BPDU messages whose type complies approximately with Institute of Electrical and Electronics Engineers (IEEE) 802.1D specification standard.

* * * * *